United States Patent
Morton et al.

(10) Patent No.: US 11,646,756 B1
(45) Date of Patent: May 9, 2023

(54) DETERMINING SAMPLING THRESHOLDS OF SERDES RECEIVERS

(71) Applicant: Hewlett Packard Enterprise Development LP, Houston, TX (US)

(72) Inventors: Kit MacCarthy Morton, Fort Collins, CO (US); Jason Douglas Jung, Fort Collins, CO (US); Jeffrey Zenning Chow, Fort Collins, CO (US); Alexander David Wilson, Wellington, CO (US); David Ritter Thomas, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/645,341

(22) Filed: Dec. 21, 2021

(51) Int. Cl.
  H04B 10/69 (2013.01)
  H04B 1/10 (2006.01)
  H04L 25/49 (2006.01)

(52) U.S. Cl.
  CPC .............. *H04B 1/10* (2013.01); *H04B 10/695* (2013.01); *H04L 25/4927* (2013.01)

(58) Field of Classification Search
  CPC ........ H04B 1/10; H04B 10/69; H04B 10/695; H04L 25/4927
  See application file for complete search history.

(56) References Cited

U.S. PATENT DOCUMENTS

| | | | |
|---|---|---|---|
| 5,544,175 A * | 8/1996 | Posse | G01R 31/31935 714/724 |
| 9,049,075 B2 | 6/2015 | Juenemann et al. | |
| 9,699,009 B1 | 7/2017 | Ainspan et al. | |
| 9,847,839 B2 | 12/2017 | Gopalakrishnan et al. | |
| 10,142,089 B2 | 11/2018 | Yao et al. | |
| 10,892,763 B1 | 1/2021 | Hidaka et al. | |
| 10,992,501 B1 | 4/2021 | Sun et al. | |
| 2016/0365991 A1 * | 12/2016 | Ganesan | H04B 1/7115 |
| 2018/0302264 A1 | 10/2018 | Liao et al. | |
| 2019/0028236 A1 | 1/2019 | Tonietto et al. | |
| 2020/0099449 A1 | 3/2020 | Way et al. | |
| 2021/0111793 A1 | 4/2021 | Barrier, IV | |
| 2022/0302942 A1 * | 9/2022 | Shahramian | H04B 1/1607 |

* cited by examiner

*Primary Examiner* — David S Huang
(74) *Attorney, Agent, or Firm* — Hewlett Packard Enterprise Patent Department

(57) ABSTRACT

Examples relate to determining a sampling threshold of a receiver (e.g., SERDES receiver). In particular, the examples relate to determining an updated sampling threshold of the receiver based on a reference sampling threshold of the receiver. A controller may determine the reference sampling threshold based on the training sequence and determine an upper voltage level and a lower voltage level of a voltage range based on the reference sampling threshold of the receiver. The controller then narrows the voltage range based on upper voltage accumulated hit rate and a lower voltage accumulated hit rate to determine the updated sampling threshold of the receiver.

20 Claims, 7 Drawing Sheets

DETERMINING SAMPLING THRESHOLDS OF SERDES RECEIVERS

BACKGROUND

Data signals may be communicated between two devices (e.g., transmitter and receiver) over one or more communications links. Transmission of data signals via the communication links commonly suffer from undesirable signal impairments (e.g., attenuation, noise, etc.) that deteriorate the quality of the data signals. To protect the integrity of a data signal, a receiver (e.g., a serializer/deserializer (SERDES) receiver) recovers the data signal by appropriate sampling and quantization.

BRIEF DESCRIPTION OF THE DRAWINGS

Various examples will be described below with references to the following figures.

Figure 1:
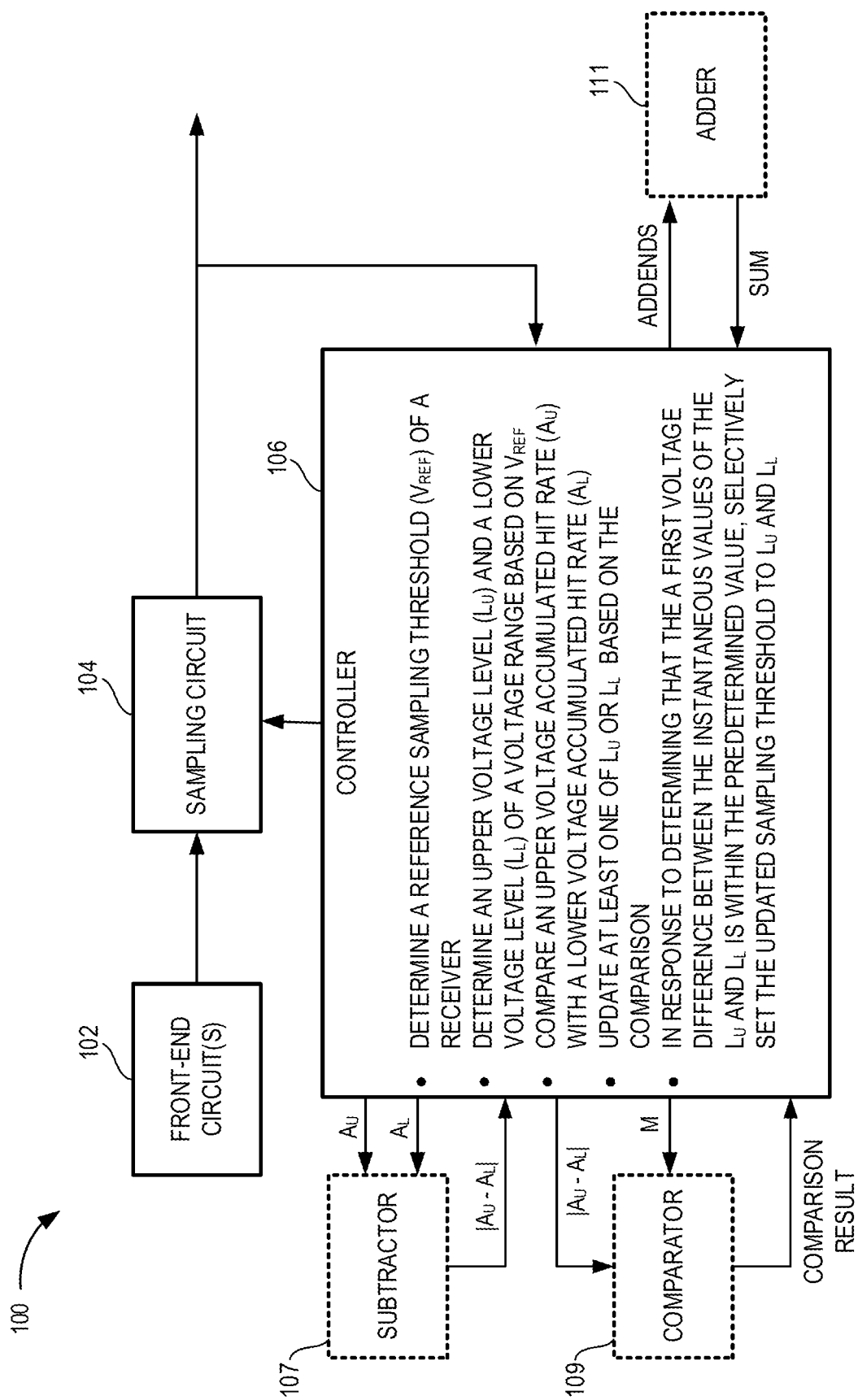
FIG. 1 is a block diagram of a SERDES receiver for determining a sampling threshold of the SERDES receiver, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers or symbols are used in the drawings and the following description refers to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Data signals received at a receiver often differ from the data signal transmitted from a transmitter due to signal impairments such as attenuation, distortion, and noise. Such signal impairments may cause various changes that degrade the quality of the data signals and the overall performance of a communication system. The performance of the communication system is usually measured in terms of Bit Error Rate (BER) that represents the ability of the communication systems to pass bits without errors. For high-speed data communication systems such as systems that use multi-level pulse-amplitude modulation (PAM) or multi-PAM format (e.g., PAM4), these signal impairments may be more prominent due to high data rates and cause high BER.

To capture a data signal correctly, a receiver (e.g., a SERDES receiver) may utilize a sampling circuit to compare the data signal with one or more threshold voltages (hereinafter referred to as "sampling thresholds") to interpret each symbol (which may represent one or more bits) of the data signal as one or more digital states (e.g., digital states '0' and '1'. In communication systems using Non-Return to Zero (NRZ) format, the sampling circuit may use a single sampling threshold to interpret each symbol of the received data signal in a digital state '1' when a voltage signal representing the symbol of the received data signal is greater than the sampling threshold and a digital state '0' when the voltage signal is less than the sampling threshold. In communication systems using PAM4 format, a receiver may interpret a voltage signal representing each symbol of the received data signal into four digital states 00, 01, 10, and 11 defined by three sampling thresholds.

The receiver may generally use eye scan information generated by an eye scan circuit or a controller to analyze the quality of the received data signal. For illustration purposes, the eye scan information may be represented with help of an eye diagram which is an imaginary time-folded representation of a data signal that is derived from a waveform by repeating the parts of the waveform corresponding to each symbol into a single graph with a voltage representing the data signal on a vertical axis and time on a horizontal axis. By repeating this construction over many samples of the waveform, the resulting graph represents the average statistics indicative of the quality of the data signal received at a receiver. Similarly, the controller may obtain eye scan information by averaging data derived from the signal. For example, in a system implementing Non-Return to Zero (NRZ) encoding, the eye scan information may be represented as an eye diagram including a single eye corresponding to a single sampling threshold. The single eye represents a range of voltages between two voltage values representing the digital states '0' and '1'. In such a case, the single sampling threshold is configured as a decision threshold for decoding a given voltage level as one of the digital states '0' and '1'.

In communication systems using PAM4 format, eye scan information may include three eyes corresponding to three sampling thresholds. Each of the three eyes represents a range of voltages, between two contiguous voltages, representing two contiguous digital states of the digital states 00, 01, 10, and 11. The contiguous voltages corresponding to the four digital states defining the three eyes may be referred to as levels 0, 1, 2, and 3. In the PAM4 based receivers, the three sampling thresholds are configured for decoding a given voltage level as one of the digital states 00, 01, 10, and 11.

Typically, the sampling thresholds are defined during a training phase (which typically occurs during the startup of the system). The receiver may determine the sampling thresholds using eye scan information generated by measuring a data signal of a training sequence. For example, the receiver determines a sampling threshold at a voltage corresponding to a center of an eye in the eye diagram. The term "center of an eye" is a voltage value that is in the middle of a voltage range of the eye. The receiver may locate the center of the eye based on a vertical eye-opening of the eye. However, it may be challenging to accurately locate the center of the eye due to distortions in the received data signal. Inaccuracy in locating the center of the eye may provide an inaccurate sampling threshold. If the sampling threshold is inaccurate, a probability of incorrectly interpreting the digital state for the received data signal may increase, which may result in increased BER.

Examples described herein provide techniques for determining a sampling threshold of a receiver (e.g., SERDES receiver). In the described examples, a controller determines a sampling threshold of the receiver that is more accurate and reliable as compared to the one determined using traditional techniques. The controller uses eye scan information corresponding to a data signal of a training sequence to determine the sampling threshold. The controller determines a value of a sampling threshold (referred to herein as a reference sampling threshold) by locating a center of an eye in the eye diagram. The controller then determines a voltage range that contains an updated value of the sampling threshold (referred to herein as an updated sampling threshold) of the receiver. The controller then narrows the voltage range to find the updated sampling threshold. The controller narrows the voltage range based on accumulated hit rates of the data signal corresponding to the respective voltage levels defining the voltage range containing the updated sampling threshold.

In some examples, a controller may determine a reference sampling threshold of a receiver based on a training sequence received by the receiver. The controller may then determine an upper voltage level and a lower voltage level of a voltage range based on the reference sampling threshold. The controller may compare an upper voltage accumulated hit rate with a lower voltage accumulated hit rate and update at least one of the upper voltage level or the lower voltage level based on the comparison. Updating the upper voltage level may include decrementing the upper voltage level by a predetermined value and updating the lower voltage level may include incrementing the lower voltage level by the predetermined value. After updating at least one of the upper voltage level or the lower voltage level, the controller may determine whether a voltage difference (e.g., a first voltage difference) between the instantaneous values of the upper voltage level and the lower voltage level is smaller than or equal to the predetermined value. In response to determining that the first voltage difference is smaller than or equal to the predetermined value, the controller may selectively set the updated sampling threshold of the receiver at the instantaneous value of the upper voltage level or the instantaneous value of the lower voltage level based on accumulated hit rates corresponding to the instantaneous values of the upper voltage level and the lower voltage level. In some examples, setting the updated sampling threshold of the receiver may mean that the controller sets the receiver to compare a received data signal with the updated sampling threshold to interpret its digital state.

Throughout the disclosure and in the appended claims, the term "voltage level" (e.g., upper voltage level and lower voltage level) may correspond to a voltage within a range of voltages. Further, a voltage difference between an upper voltage level and a lower voltage level may be referred to as a first voltage difference for the first iteration, and a voltage difference between an upper voltage level and a lower voltage level may be referred to as a second voltage difference for the next iteration.

In the examples described herein, the disclosed technique provides the updated sampling threshold of the receiver that is different from the reference sampling threshold. When the controller utilizes the described technique for setting the updated sampling threshold of the receiver, it is observed that a value of BER reduces as compared to a value of BER when the controller utilizes the reference sampling threshold. In addition, it is also observed that when the controller utilizes the described technique for setting the updated sampling threshold of the receiver, the values of BER over several training sequences have fewer variations as compared to variations in the values of BER when the controller utilizes the reference sampling threshold. These observations indicate that the determined updated sampling threshold is more accurate and reliable as compared to that of the reference sampling threshold.

Examples are further described herein with reference to FIGS. 1, 2A-2H, and 3-4. Any functionality described herein may be performed by an electronic hardware logic including electronic circuitry, logic gates, etc., of a receiver. In some examples, the functionality described herein may be performed by a controller of a SERDES receiver by way of at least one processor executing instructions stored in a memory (e.g., a machine-readable storage medium).

FIG. 1 is a block diagram depicting a portion of an example receiver 100 (e.g., SERDES receiver). The term "receiver" as used herein may refer to a stand-alone receiver or a transceiver module operating in a receiving mode. The receiver 100 may be an electrical receiver or an optoelectronic receiver. The receiver 100 includes one or more front-end circuitry 102, a sampling circuit 104, and a controller 106. The front-end circuitry 102 may be configured to receive a data signal from an external source (e.g., a transmitter) and output a voltage signal V corresponding to the received data signal. The front-end circuitry 102 may include one or more electronic circuitry (e.g., gain stages and equalizer circuits) to enhance the quality of the received data signal of a training sequence by adding gain and/or minimizing distortions in the received data signal.

The sampling circuit 104 is coupled to the front-end circuitry 102 to receive the voltage signal V from the front-end circuitry 102. The sampling circuit 104 applies a decision logic to the received voltage signal V to determine a symbol (i.e., a sample) for a time period (i.e., a sampling period). A sample represents the data received by the receiver 100 over a communication link in a sampling period. The sampling circuit 104 may include one or more slicers that are configured to slice the received voltage signal V into two or more digital states (e.g., digital states 00, 01, 10, and 11 for communication systems using PAM4 format) based on one or more sampling thresholds.

In some examples, the receiver 100 may include an eye scan circuit (not shown) to generate an eye scan information indicative of the quality of the received data signal as represented by the voltage signal V. The eye scan circuit may be communicatively coupled to the controller 106 to provide the eye scan information to the controller 106. For example, the eye scan circuit may include a suitably configured Field Programmable Gate Array (FPGA), an Application Specific Integrated Circuit (ASIC), another microcontroller having a processor and memory, or other electronic circuitry that analyzes the incoming signal and generate the scan information. As previously noted, the eye scan information may be represented in the form of a graphical representation called an eye diagram for ease of illustration.

The controller 106 is coupled to the sampling circuit 104 to receive the samples from the sampling circuit 104. In some examples, the controller 106 may also receive the eye scan information from the eye scan circuit. The controller 106 may be a microcontroller comprising at least a processor and a memory. In some examples, the controller 106 may be implemented as an ASIC, system-on-chip (SOC), an FPGA, logic gates, comparators, logical adder circuits, or the like. The controller 106 may include logic to perform one or more of the functionalities described herein. The logic may be implemented in hardware or firmware. The controller 106 may perform a number of operations to analyze the received data signal represented by the samples from the sampling circuit 104.

To properly decode information symbols from an incoming signal, the sampling circuit 104 may be configured with sampling thresholds, for example, three sampling thresholds in the case of PAM4 applications. With varying operating conditions, it is useful to update the sampling thresholds for accurate detection of the symbols. To that end, in some examples, during a training phase, the controller 106 is configured to determine an updated sampling threshold of the receiver 100 and tune the sampling circuit 104 based on the updated sampling threshold. In the description hereinafter, operations to determine one of the three sampling thresholds are described. It is to be noted that the remaining of the three sampling thresholds may be updated in the similar manner without limiting the scope of the disclosure.

The functionalities performed by the controller 106 for determining an updated sampling threshold of the receiver 100 are described with reference to FIGS. 2A-2H. FIGS. 2A-2H are described in conjunction with FIG. 1. FIGS. 2A-2H schematically depict example histogram plots 200A-200H at various stages of determination of an updated sampling threshold. For example, in the present context, histogram plots depicted in FIGS. 2A-2H may represent a portion of the eye scan information corresponding to the training sequence for a range of voltages at a data sampling phase. The term "data sampling phase" refers to a phase angle or a sampling point within each sample period at which the sampling circuit 104 samples the voltage signal received from the front-end circuitry 102. In particular, the histogram plot represents the distribution of voltage signals for a given sample (e.g., any of 00, 01, 10, or 11) over multiple samples.

The horizontal axis (i.e., X-axis) of each of the histogram plots 200A-200H represents voltages and the vertical axis (i.e., Y-axis) of each of the histogram plots 200A-200H represents a hit rate of the given symbol. In particular, in the examples of FIGS. 2A-2H, the horizontal axis of the histogram shows a series of voltages (e.g., $V_1, V_2, \ldots V_{13}$) with a voltage interval ($\Delta V$) (e.g., 5 mv) between any two adjacent voltages (e.g., between $V_1$ and $V_2$) in the series of voltages (e.g., $V_1, V_2, \ldots V_{13}$). In some examples, the voltage interval ($\Delta V$) represents a voltage resolution of the receiver 100 depending on the implementation of the receiver 100. Further, as used herein, the term "hit rate" at a given voltage may refer to a probability that a voltage signal representing a data signal is within plus or minus one voltage margin. The voltage margin may be a value that is half of the voltage resolution of the receiver 100. For example, if the voltage resolution of the receiver 100 is 6 mV, the voltage margin is 3 mV and a hit rate at a voltage of 100 mV is a probability that the voltage signal is between 97 mV and 103 mV.

While analyzing the data signal of the training sequence, the controller 106 may determine a reference sampling threshold ($V_{ref}$) of the receiver 100 using the eye scan information. In some examples, the controller 106 may locate a center of a given eye (e.g., defined between level 0 and level 1) of an eye diagram and establish $V_{ref}$ at a voltage level corresponding to the center of the given eye. The controller 106 may determine a voltage level for which a minimum hit rate is observed and establish $V_{ref}$ at the determined voltage level. In the example histogram plot 200A of FIG. 2A, the controller 106 observes a minimum hit rate at voltage $V_7$. The controller 106 then establishes $V_{ref}$ of the receiver 100 at voltage $V_7$.

Figure 2A:
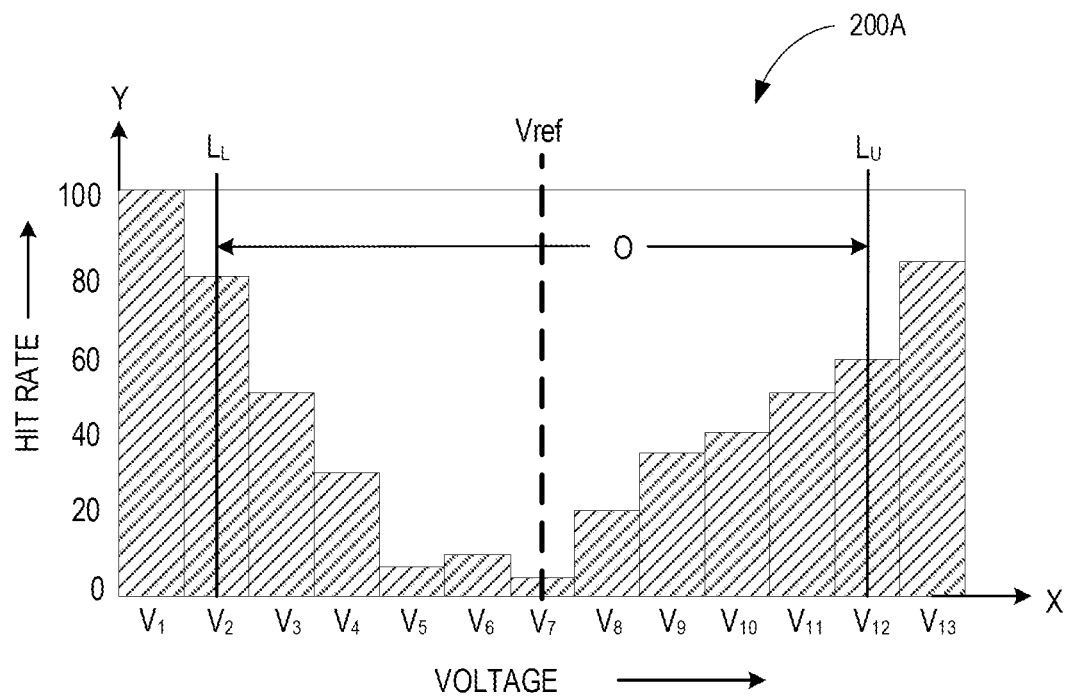
FIGS. 2A-2H schematically depict histogram plots at various stages of determination of an updated sampling threshold, in accordance with an example.

Further, the controller 106 may determine an upper voltage level $L_U$ and a lower voltage level $L_L$ of a voltage range containing an updated sampling threshold of the receiver 100. The controller 106 may determine $L_U$ and $L_L$ based on $V_{ref}$. In some examples, the controller 106 may determine $L_U$ and $L_L$ using example relationships represented by equations (1) and (2).

$$L_L = V_{ref} - \tfrac{1}{2}O \quad (1)$$

$$L_U = V_{ref} + \tfrac{1}{2}O \quad (2)$$

where 'O' represents a preconfigured value for setting an initial width of the voltage range that contains the updated sampling threshold. In an example, the preconfigured value 'O' is equal to the largest expected value of a vertical eye-opening. The controller 106 may receive the preconfigured value of 'O' before the training phase. In the example of FIG. 2A, the preconfigured value 'O' is a value equal to ten times the voltage interval (i.e., 10 $\Delta V$). For example, if the preconfigured value 'O' is 50 mV and the voltage interval ($\Delta V$) is 5 mV, the value of 'O' is 10 $\Delta V$. According to equations (1) and (2), the controller 106 computes $L_L$ and $L_U$ as represented by equations 3 and 4, respectively.

$$L_L = V_7 - 5\,\Delta V \quad (3)$$

$$L_U = V_7 + 5\,\Delta V \quad (4)$$

In this example, $L_L$ and $L_U$ respectively correspond to voltages $V_2$ and $V_{12}$.

Furthermore, the controller 106 may determine accumulated hit rates of the sample corresponding to $L_U$ and $L_L$. As used herein, the term "accumulated hit rate" for a given voltage level is a sum of the hit rates for a range of voltage encompassing the given voltage. The range of voltages for which the hit rates are accumulated may include one or more contiguous voltages. In some examples, the range of voltages includes a single voltage corresponding to the instantaneous value of the given voltage level. In some other examples, the range of voltages includes multiple contiguous voltages corresponding to an instantaneous value of the given voltage level and one or more previous values of the given voltage level. The accumulated hit rate corresponding to the $L_U$ is indicated herein by '$A_U$' and is also referred to as upper voltage accumulated hit rate. The accumulated hit rate corresponding to $L_L$ is indicated herein by '$A_L$' and is also referred to as lower voltage accumulated hit rate.

At the first occurrence of determining $A_U$, the range of voltages for which the hit rates are accumulated may include the instantaneous value of $L_U$. Similarly, at the first occurrence of determining $A_L$, the range of voltage for which the hit rates are accumulated may include the instantaneous value of $L_L$. Accordingly, the accumulated hit rates $A_U$ and $A_L$ corresponding to the respective $L_U$ and $L_L$ are the hit rates at the respective $L_U$ and $L_L$.

Accordingly, in the example of FIG. 2A, $A_U$ corresponding to $L_U$ is equal to a hit rate ($E_U$) at $V_{12}$ (see equation 5) and $A_L$ corresponding to $L_L$ is equal to a hit rate ($E_L$) at $V_2$ (see equation 6). In FIG. 2A, $$A_U(V_{12}) = E_U(V_{12}) = 60 \quad (5)$$

$$A_L(V_2) = E_L(V_2) = 80 \quad (6)$$

The controller 106 may then compare $A_U$ with $A_L$. In some examples, the controller 106 may compare $A_U$ with $A_L$ according to a comparison margin (M). In some examples, the controller 106 may determine the comparison margin (M) using an example relationship represented by equation (7).

$$M = 2^{\lfloor \log_{10}(\min(x,y)) \rfloor + 1} * C \quad (7)$$

where 'x' and 'y' are the values (e.g., $A_U$ and $A_L$) being compared, min(x, y) represents a lower of the values x and y, and 'C' is a scaling factor. The scaling factor C may be a fixed predetermined value. for illustration purposes, in the description hereinafter value of the scaling factor C is considered to be 4 (four).

To compare $A_U$ with $A_L$, the controller 106 may determine whether an absolute difference between $A_U$ and $A_L$ is smaller than or equal to the comparison margin (M) (i.e., ≤M), or greater than the comparison margin (M) (i.e., >M). In some examples, the controller 106 may use comparison conditions represented in equations (8a)-(8d) to compare $A_U$ and $A_L$.

$$A_L - A_U > M \quad (8a)$$

$$A_U - A_L > M \quad (8b)$$

$$A_L - A_U \leq M \quad (8c)$$

$$A_U - A_L \leq M \quad (8d)$$

In the example of FIG. 2A, where for $A_U$=60, $A_L$=80, and C=4, the controller 106 may determine the comparison margin (M) as being 16 according to equation (7). The controller 106 may then determine that an absolute difference between $A_U$ and $A_L$ (i.e., 80−60=20) is greater than the comparison margin (M) (i.e., 20>16) and $A_U$ and $A_L$ satisfy the comparison condition of equation (8a) (i.e., $A_L-A_U$>M). In some examples, such comparison operations may be performed by hardware electronic comparators (not shown).

In some examples, the controller 106 may be connected to hardware such as a subtractor 107. The subtractor 107 may be a device implemented using digital logic gates or equivalent circuitry that compare quantities and output a digital signal indicating a difference between the two quantities. For example, the controller 106 may provide values of $A_L$ and $A_U$ to the subtractor 107. In return, the subtractor 107 may provide an absolute value of the difference between $A_L$ and $A_U$ to the controller 106. Further, in some examples, the controller 106 may be connected to hardware such as a comparator 109. The comparator 109 may be a device implemented using digital logic gates or equivalent circuitry that compare quantities and output a comparison result between the two quantities. For example, the controller may provide values of the comparison margin (M) and the difference between $A_L$ and $A_U$ to the comparator 109. In return, the comparator 109 may provide a comparison result. The comparison result may indicate any of the four conditions represented via the equations (8a)-(8d). In particular, the comparison result may indicate that whether the absolute difference between $A_L$ and $A_U$ is greater than the comparison margin (M) or not. It is to be noted that in some examples, functionalities of the subtractor 107 and the comparator 109 may be combined into a single device or circuit. In some examples, the operations performed by the subtractor 107 and the comparator 109 may be performed by the controller 106 itself.

Based on the comparison of $A_U$ and $A_L$, the controller 106 may update at least one of $L_U$ or $L_L$. In some examples, when the absolute difference between $A_U$ and $A_L$ corresponding to the respective $L_U$ and $L_L$ is less than or equal to the comparison margin (M) (i.e., $A_L$ and $A_U$ satisfy the comparison conditions of equations (8c) and (8d)), the controller 106 may update both $L_U$ and $L_L$. In some other examples, when the absolute difference between $A_U$ and $A_L$ corresponding to the respective $L_U$ and $L_L$ is greater than the comparison margin (M) (i.e., $A_L$ and $A_U$ do not satisfy the comparison conditions of equations (8c) and (8d)), the controller 106 may update one of $L_U$ or $L_L$. In some examples, when $A_L$ is greater than $A_U$ (i.e., $A_L$ and $A_U$ satisfy the comparison condition of equation (8a)), the controller 106 may update $L_L$ to an updated value and retain $L_U$ at a previous value. In other examples, when $A_U$ is greater than $A_L$ (i.e., $A_U$ and $A_L$ satisfy the comparison condition of equation (8b)), the controller 106 may update $L_U$ to an updated value and retain $L_L$ at the previous value.

Updating $L_U$ may include decrementing $L_U$ by a predetermined value. In some examples, the predetermined value is the voltage interval (ΔV). Updating $L_L$ may include incrementing $L_L$ by the predetermined value. Table 1 shows update conditions for updating one or both of $L_U$ or $L_L$ based on the comparison conditions represented in equations (8a)-(8d). Table 1 also includes update conditions for $A_U$ and $A_L$ corresponding to the instantaneous values of the respective $L_U$ and $L_L$. As shown in Table 1, when the controller 106 updates one of $L_U$ or $L_L$, the controller 106 may determine $A_U$ or $A_L$ corresponding to the updated voltage level ($L_U$ or $L_L$) by determining $E_U$ or $E_L$ at the updated voltage level ($L_U$ or $L_L$). Further, when the controller 106 updates both $L_U$ and $L_L$, the controller 106 may compute $A_U$ by summing up $E_U$ at the instantaneous value (i.e., updated value) of $L_U$ and $A_U$ corresponding to the previous value of $L_U$ and similarly, compute the accumulated hit rate $A_L$ by summing up $E_L$ at the instantaneous value (i.e., updated value) of $L_L$ and $A_L$ corresponding to the previous value of $L_L$. In some examples, to perform such sum the controller 106 may send the quantities to be added (e.g., the values of $E_L$ at the instantaneous value of $L_L$ and $A_L$ corresponding to the previous value of $L_L$), labeled as addends in FIG. 1, to hardware such as adder 111. The adder 111 may be a device implemented using digital logic gates or equivalent circuitry that sum the quantities and output the sum of the quantities to the controller 106. It is to be noted that in some examples, functionalities of the subtractor 107, the comparator 109, and the adder 111 may be combined into a single device or circuit. In some examples, the operations that are performed by the adder 111 may be performed by the controller 106 itself.

TABLE 1

Update conditions for upper voltage level and lower voltage level based on comparison conditions

| Comparison condition | Update Conditions for Upper and Lower voltage Levels | | | |
|---|---|---|---|---|
| | $L_L$ | $A_L$ | $L_U$ | $A_U$ |
| $A_L - A_U > M$ (Equation (8a)) | Update to an updated value of $L_L$ | $E_L$ at the updated value of $L_L$ | Retain at the previous value of $L_U$ | $E_U$ at the previous value of $L_U$ |
| $A_U - A_L > M$ (Equation (8b)) | Retain at the previous value of $L_L$ | $E_L$ at the previous value of $L_L$ | Update to an updated value of $L_U$ | $E_U$ at the updated value of $L_U$ |
| $A_L - A_U \leq M$ (Equation (8c)) and $A_U - A_L \leq M$ (Equation (8d)) | Update to an updated value of Ll | $A_L$ corresponding to the previous value of $L_L + E_L$ at the updated value of $L_L$ | Update to an updated value of $L_U$ | $A_U$ corresponding to the previous value of $L_U + E_U$ at the updated value of $L_U$ |

In the example of FIG. 2A, the controller 106 determines that $A_U$ and $A_L$ satisfy the comparison condition of equation (8a) (i.e., $A_L-A_U$>M) as discussed above. Accordingly, based on the update conditions of Table 1, the controller 106 increments $L_L$ from $V_2$ to $V_3$ (shown by a dotted line in FIG. 2B) and retains $L_U$ at $V_{12}$ (shown by a solid line in FIG. 2B).

After updating at least one of $L_U$ or $L_L$, the controller 106 may determine a first voltage difference ($Vd_1$) between the instantaneous values of $L_U$ (the previous value or the updated value) and $L_L$ (the previous value or the updated value) and then determine whether $Vd_1$ is smaller than or equal to the predetermined value (e.g., the voltage interval $\Delta V$). In some instances, if $Vd_1$ is smaller than or equal to the predetermined value, the controller 106 may selectively set the updated sampling threshold of the receiver 100 at one of the instantaneous values of $L_U$ or $L_L$ based on $A_U$ and $A_L$ corresponding to the instantaneous values of the respective $L_U$ and $L_L$. In particular, the controller 106 may selectively set the updated sampling threshold by setting it to the instantaneous value of the voltage level ($L_U$ or $L_L$). In some examples, if $A_U$ at the instantaneous value of $L_U$ is lower than or equal to $A_L$ corresponding to the instantaneous value of $L_L$ (i.e., $A_U$ $A_L$), the controller 106 sets the updated sampling threshold of the receiver 100 at the instantaneous value of $L_U$. In some instances, when $Vd_1$ is zero (i.e., when $L_U=L_L$), the controller 106 may set the updated sampling threshold of the receiver 100 to any of the instantaneous values of $L_U$ or $L_L$. In some examples, setting the updated sampling threshold may include setting the sampling circuit 104 of the receiver 100 to sample a voltage signal (V) based on the updated sampling threshold.

In some other instances, if $Vd_1$ is greater than the predetermined value, the controller 106 may set a new upper voltage level and a new lower voltage level of the voltage range containing the updated sampling threshold. The controller 106 may set the new upper voltage level and the new lower voltage level, respectively, at the instantaneous value of $L_U$ (i.e., at the previous value or the updated value) and the instantaneous value of $L_L$ (i.e., at the previous value or the updated value).

The controller 106 may then again determine $A_U$ and $A_L$ corresponding to the set $L_U$ (i.e., new upper voltage level) and the set $L_L$ (i.e., new lower voltage level) and compare them according to conditions as given in Table 1. The controller 106 may then compute the comparison margin (M) based on the $A_U$ and $A_L$ according to the relationship of equation (7). The controller 106 may then compare $A_U$ with $A_L$ with each other using the computed comparison margin (M) and the comparison conditions of equations (8a)-(8d).

The controller 106 may again update at least one of the set $L_U$ or the set $L_L$ based on the comparison of the $A_U$ and $A_L$. After updating at least one of the set $L_U$ or the set $L_L$, the controller 106 may again determine whether a voltage difference (i.e., a second voltage difference $Vd_2$) between the instantaneous values of $L_U$ and $L_L$ is smaller than or equal to the predetermined value (e.g., voltage interval $\Delta V$). In some examples, when $Vd_2$ is smaller than or equal to the predetermined value, the controller 106 may selectively set the updated sampling threshold of the receiver 100 at one of the instantaneous values of $L_U$ or $L_L$. In some examples, when $Vd_2$ is greater than the predetermined value (e.g., the voltage interval $\Delta V$), the controller 106 may again set a new $L_U$ and a new $L_L$ of the voltage range containing the updated sampling threshold, respectively, at the instantaneous value of $L_U$ and the instantaneous value of $L_L$. The controller 106 may then repeat the process of updating at least one of $L_U$ or $L_L$ until a voltage difference between the instantaneous values of $L_U$ and $L_L$ is smaller than or equal to the predetermined value (e.g., voltage interval $\Delta V$).

Figure 2B:
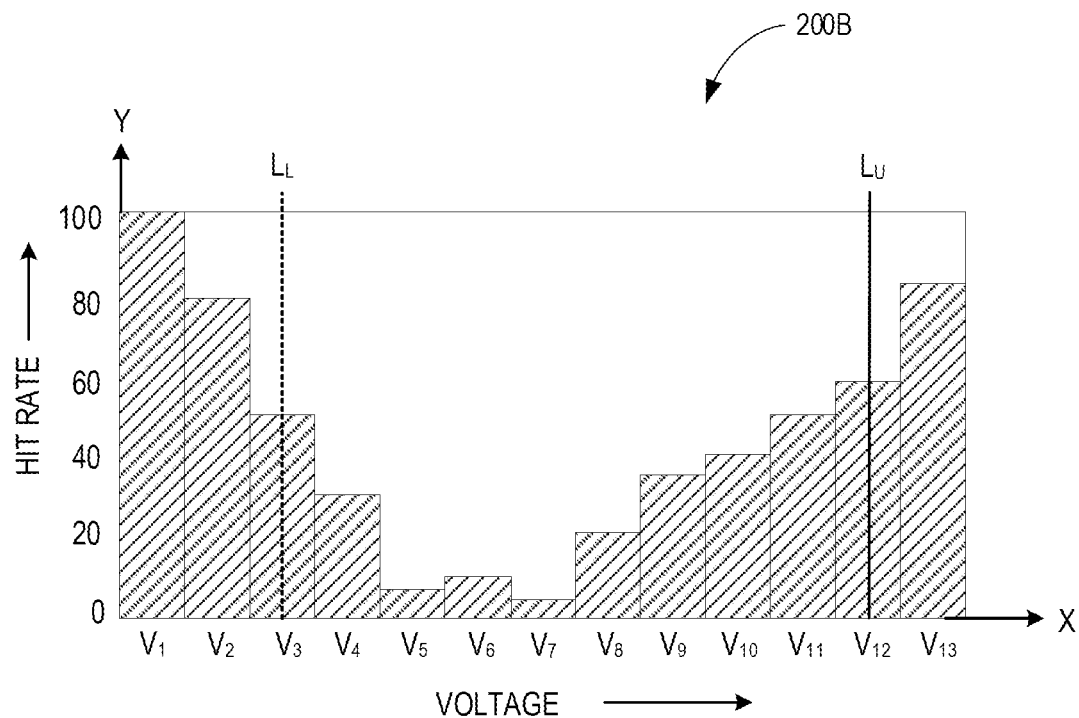

The example histogram plot 200B of FIG. 2B shows $L_U$ (i.e., retained $L_U$) at $V_{12}$ and $L_L$ (i.e., updated $L_L$) at $V_3$ after the controller 106 updates $L_L$. The controller 106 determines that a voltage difference between the instantaneous values of $L_L$ and $L_U$ (i.e., $V_{12}-V_3$) is greater than the predetermined value (i.e., $V_{12}-V_3 > \Delta V$). Accordingly, the controller 106 sets a new $L_L$ at $V_3$ and a new $L_U$ at $V_{12}$ of the voltage range containing the updated sampling threshold. The controller 106 again determines $A_U$ and $A_L$ corresponding to the instantaneous values of $L_U$ (i.e., $V_{12}$) and $L_L$ (i.e., $V_3$) using the conditions for computing $A_U$ and $A_L$ as given in Table. 1. In this example, $A_U$ is equal to $E_U$ at $V_{12}$ and $A_L$ is equal to $E_L$ at $V_3$. Accordingly, in FIG. 2B, $$A_U(V_{12})=E_U(V_{12})=60 \tag{9}$$

$$A_L(V_3)=E_L(V_3)=50 \tag{10}$$

The controller 106 then computes the comparison margin M (i.e., 16) for $A_U=60$, $A_L=50$, and $C=4$ according to equation (7). The controller 106 determines that a difference between $A_U$ and $A_L$ (i.e., $A_U-A_L=60-50=10$) is smaller than or equal to the comparison margin M (i.e., $10<16$), and $A_U$ and $A_L$ satisfy the comparison conditions of equations (8c) and (8d). The controller 106 then updates both $L_U$ and $L_L$ as per update conditions of Table 1. The controller 106 decrements $L_U$ from $V_{12}$ to $V_{11}$ and increments $L_L$ from $V_3$ to $V_4$.

Figure 2C:
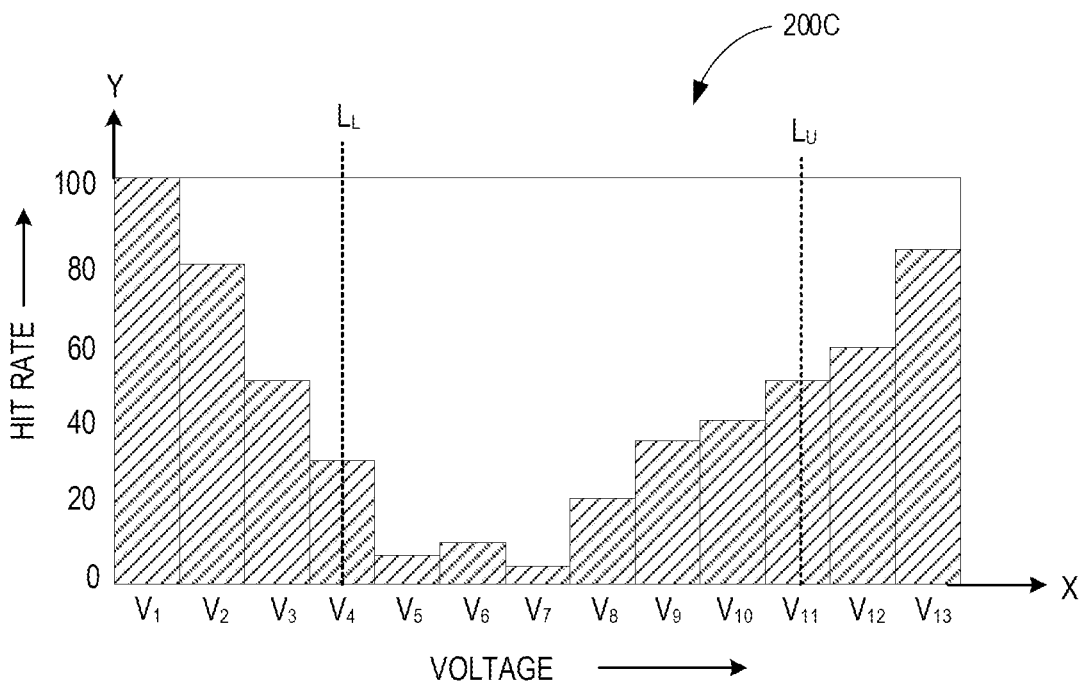

The example histogram plot 200C of FIG. 2C shows $L_U$ at $V_{11}$ and $L_L$ at $V_4$ after the controller 106 updates $L_U$ and $L_L$. As the voltage difference $V_{11}-V_4$ is greater than the predetermined value (i.e., $V_{11}-V_4 > \Delta V$), the controller 106 sets a new $L_L$ at $V_4$ and a new $L_U$ at $V_{11}$. The controller 106 again determines $A_U$ and $A_L$ based on the update conditions for $A_U$ and $A_L$ as given in Table 1. In the example of FIG. 2C, $A_U$ and $A_L$ may be determined according to relationships presented in equations 11 and 12, respectively.

$$A_U(V_{11})=A_U(V_{12})+E_U(V_{11})=60+50=110 \tag{11}$$

$$A_L(V_4)=A_L(V_3)+E_L(V_4)=50+30=80 \tag{12}$$

The controller 106 then determines the value of the comparison margin M as 16 for $A_U=110$, $A_L=80$, and $C=4$ according to equation (7). Accordingly, the controller 106 determines that the difference between $A_U$ and $A_L$ (i.e., 30) is greater than the comparison margin M (i.e., $30>16$), and $A_U$ and $A_L$ satisfy the comparison condition of equation (8a), and the controller 106. Accordingly, the controller 106 decrements $L_U$ from $V_{11}$ to $V_{10}$ and retains $L_L$ at $V_4$.

Figure 2D:
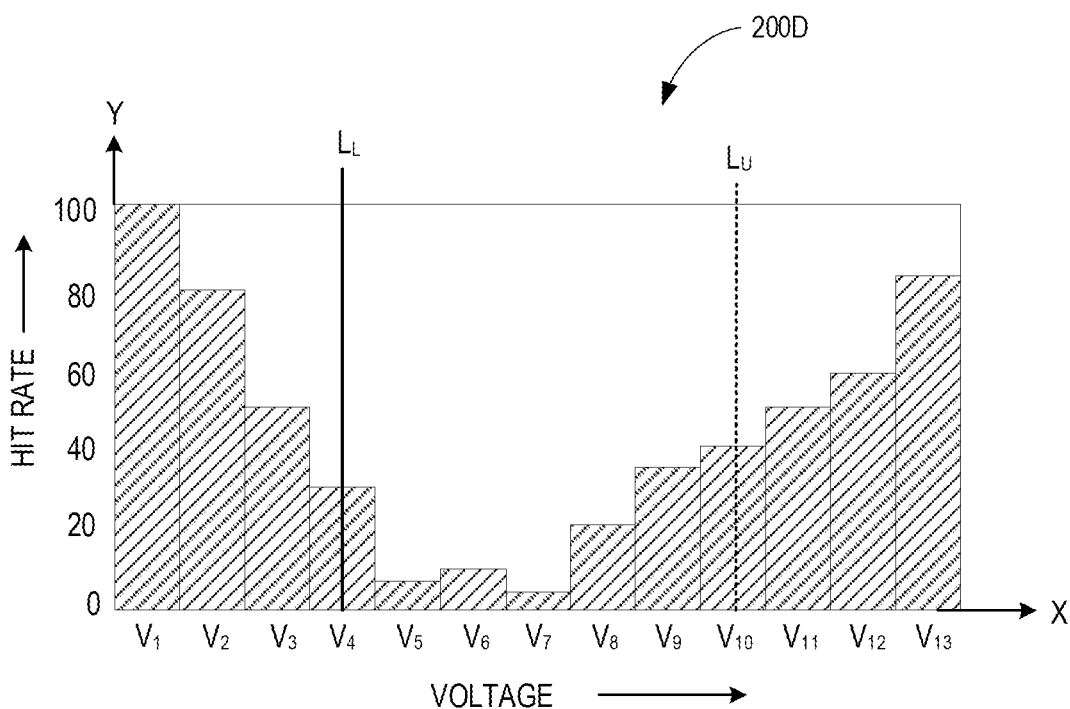

Moving to FIG. 2D, in the example histogram plot 200D, with $L_U$ being at $V_{10}$ and $L_L$ being at $V_4$ and the voltage difference $V_{10}-V_4$ is greater than $\Delta V$, the controller 106 sets a new $L_L$ at $V_4$ and a new $L_U$ at $V_{10}$. The controller 106 again determines $A_U$ and $A_L$ based on the update conditions shown in Table-1. In the example of FIG. 2D, $A_U$ and $A_L$ may be determined according to relationships presented in equations 13 and 14, respectively.

$$A_U(V_{10})=E_U(V_{10})=40 \tag{13}$$

$$A_L(V_4)=E_L(V_4)=30 \tag{14}$$

The controller 106 then determines the value of the comparison margin M as 16 for $A_U=40$, $A_L=30$, and $C=4$ according to equation (7). Accordingly, the controller 106 determines that the difference between $A_U$ and $A_L$ (i.e., 10) is smaller than the comparison margin M (i.e., $10<16$), and $A_U$ and $A_L$ satisfy the comparison condition of equations (8c) and (8d). Accordingly, the controller 106 decrements $L_U$ from $V_{10}$ to $V_9$ and increments $L_L$ to $V_5$.

Figure 2E:
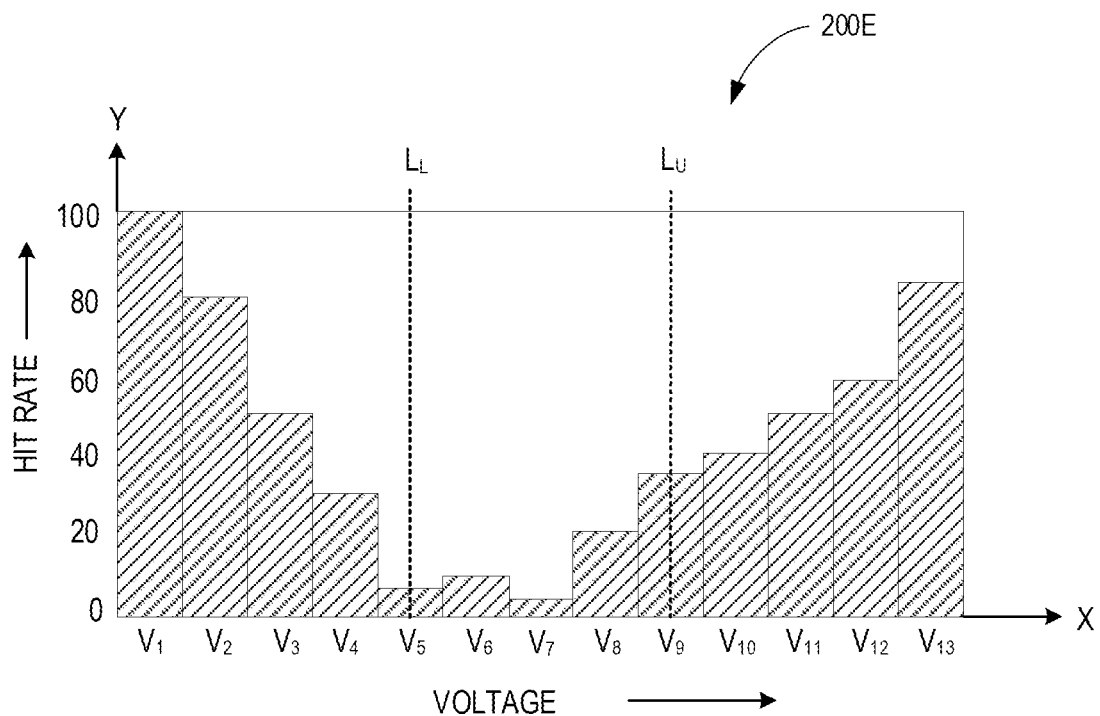

Referring now to FIG. 2E, in the example histogram plot 200E, with $L_U$ being at $V_9$ and $L_L$ being at $V_5$ and the voltage difference $V_9-V_5$ is greater than $\Delta V$, the controller 106 sets a new $L_L$ at $V_5$ and a new $L_U$ at $V_9$. The controller 106 again determines $A_U$ based on the update conditions shown in Table-1. In the example of FIG. 2E, $A_U$ and $A_L$ may be determined according to relationships presented in equations 15 and 16, respectively.

$$A_U(V_9)=A_U(V_{10})+E_U(V_9)=40+35=75 \quad (15)$$

$$A_L(V_5)=A_L(V_4)+E_L(V_5)=30+8=38 \quad (16)$$

The controller 106 then determines the value of the comparison margin M as 16 for $A_U$=75, $A_L$=38, and C=4 according to equation (7). Accordingly, the controller 106 determines that the difference between $A_U$ and $A_L$ (i.e., 37) is greater than the comparison margin M (i.e., 37>16), and $A_U$ and $A_L$ satisfy the comparison condition of equation (8a). Accordingly, the controller 106 decrements $L_U$ from $V_9$ to $V_8$ and retains $L_L$ to $V_5$.

Figure 2F:
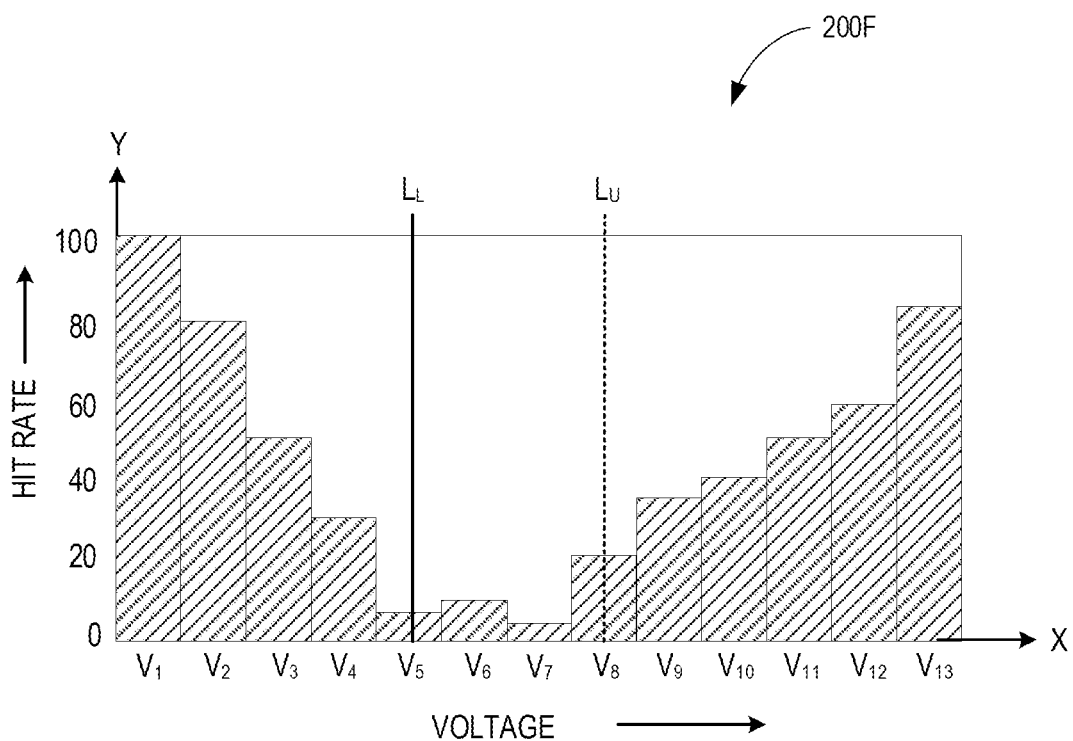

In the example histogram plot 200F of FIG. 2F, with $L_U$ being at $V_8$ and $L_L$ being at $V_5$ and the voltage difference $V_8-V_5$ is greater than $\Delta V$, the controller 106 sets a new $L_L$ at $V_5$ and a new $L_U$ at $V_8$. The controller 106 again determines $A_U$ and $A_L$ based on the update conditions shown in Table-1. In the example of FIG. 2F, $A_U$ and $A_L$ may be determined according to relationships presented in equations 17 and 18, respectively.

$$A_U(V_8)=E_U(V_8)=20 \quad (17)$$

$$A_L(V_5)=E_L(V_5)=8 \quad (18)$$

The controller 106 then determines the value of the comparison margin M as 8 for $A_U$=20, $A_L$=8, and C=4 according to equation (7). Accordingly, the controller 106 determines that the difference between $A_U$ and $A_L$ (i.e., 12) is greater than the comparison margin M (i.e., 12>8), and $A_U$ and $A_L$ satisfy the comparison condition of equation (8a). Accordingly, the controller 106 decrements $L_U$ from $V_8$ to $V_7$ and retains $L_L$ to $V_5$.

Figure 2G:
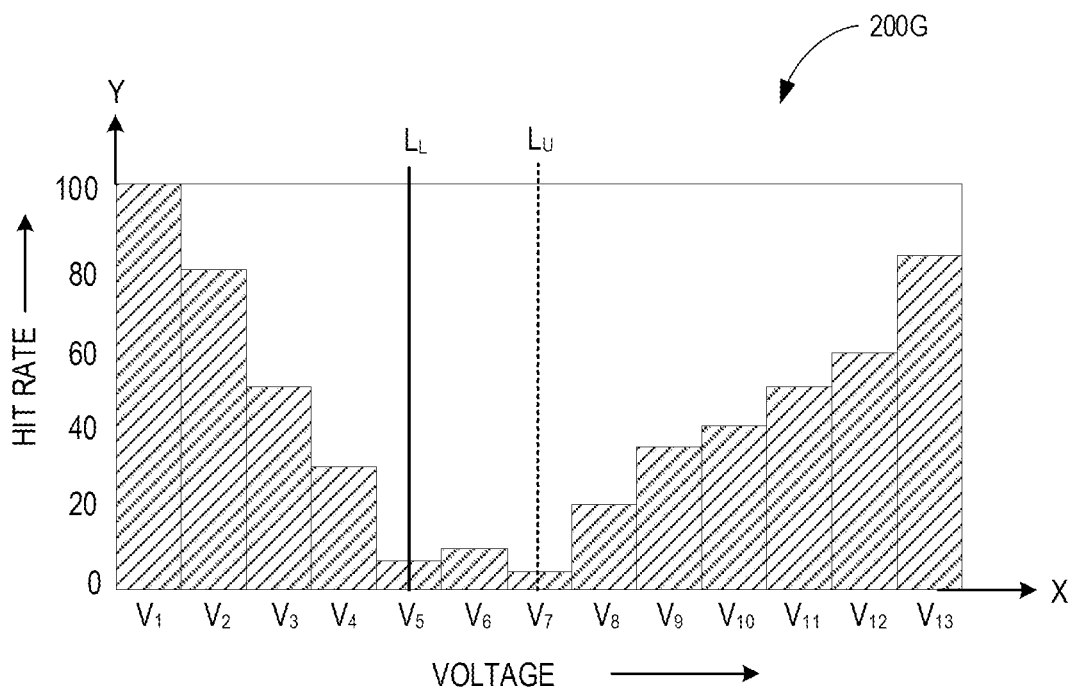

Moving to the example of FIG. 2G, with $L_U$ being at $V_7$ and $L_L$ being at $V_5$ and the voltage difference $V_8-V_5$ is greater than $\Delta V$, the controller 106 sets a new $L_L$ at $V_5$ and a new $L_U$ at $V_8$. The controller 106 again determines $A_U$ and $A_L$ based on the update conditions shown in Table-1. In the example of FIG. 2F, $A_U$ and $A_L$ may be determined according to relationships presented in equations 19 and 20, respectively.

$$A_U(V_7)=E_U(V_7)=6 \quad (19)$$

$$A_L(V_5)=E_L(V_5)=8 \quad (20)$$

The controller 106 then determines the value of the comparison margin M as 8 for $A_U$=6, $A_L$=8, and C=4 according to equation (7). Accordingly, the controller 106 determines that the difference between $A_U$ and $A_L$ (i.e., 2) is less than the comparison margin M (i.e., 2<8), and $A_U$ and $A_L$ satisfy the comparison condition of equations (8c) and 8d. Accordingly, the controller 106 decrements $L_U$ from $V_7$ to $V_6$ and increments $L_L$ to $V_6$.

Figure 2H:
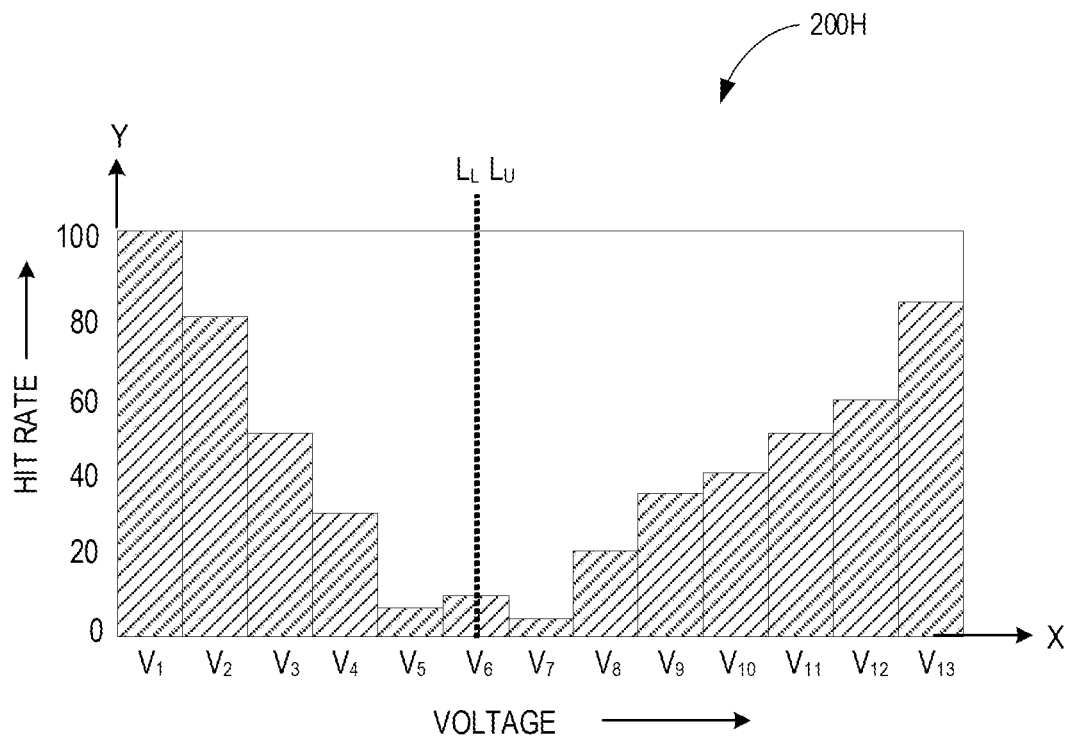

Accordingly, the example histogram plot 200H of FIG. 2H shows both $L_U$ and $L_L$ at $V_6$ after the controller 106 updates $L_U$ and $L_L$. The controller 106 determines that both the instantaneous values of $L_L$ and $L_U$ are the same (i.e., $V_6$). In this instance, the controller 106 determines that a voltage difference between the instantaneous values of $L_L$ and $L_U$ is zero (i.e., voltage difference<$\Delta V$), which is smaller than or equal to the predetermined value. Accordingly, the controller 106 sets the updated sampling threshold of the receiver 100 at $V_6$.

Figure 3:
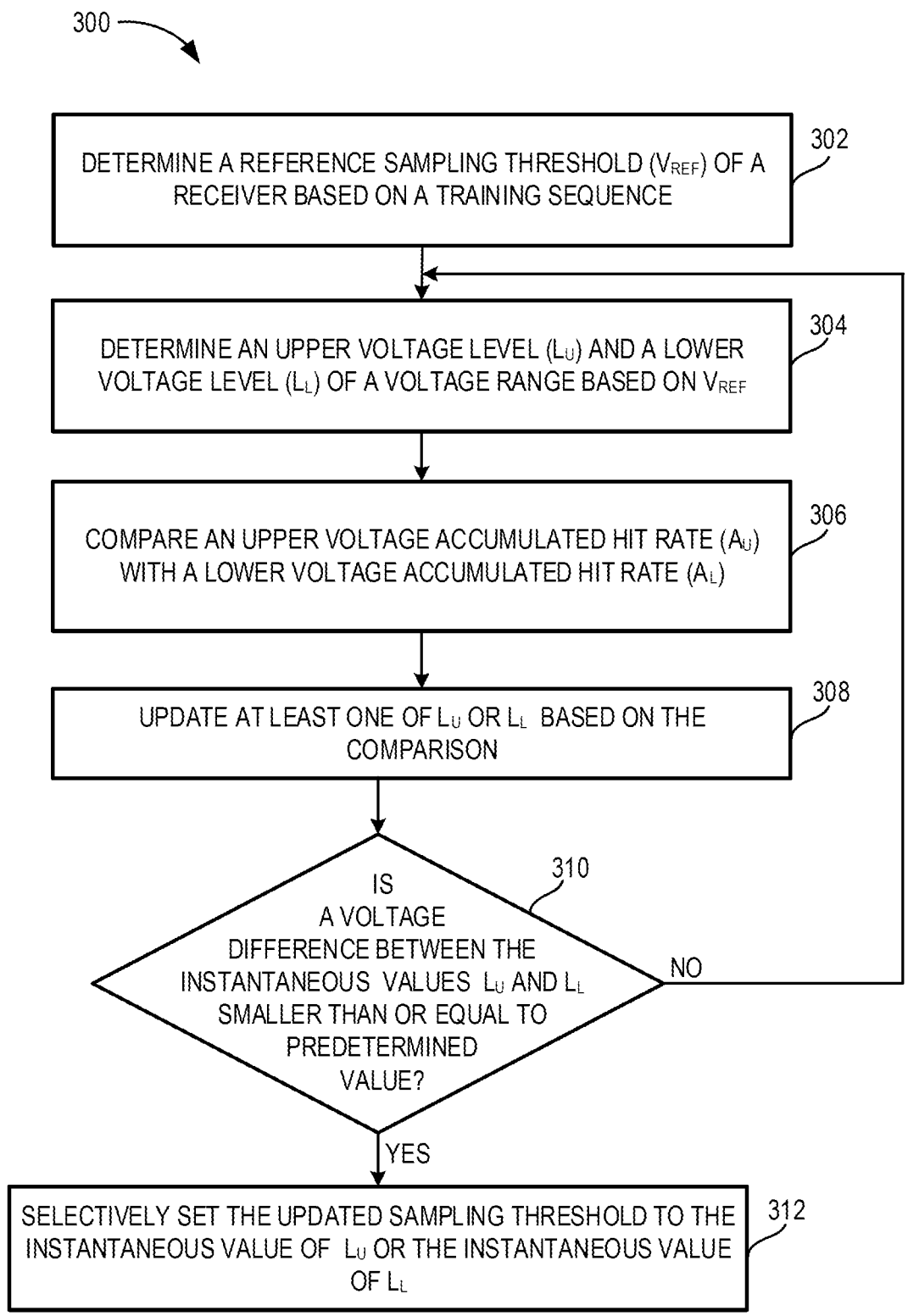
FIG. 3 is a flowchart of a method for determining a sampling threshold of a SERDES receiver, in accordance with an example.
Figure 4:
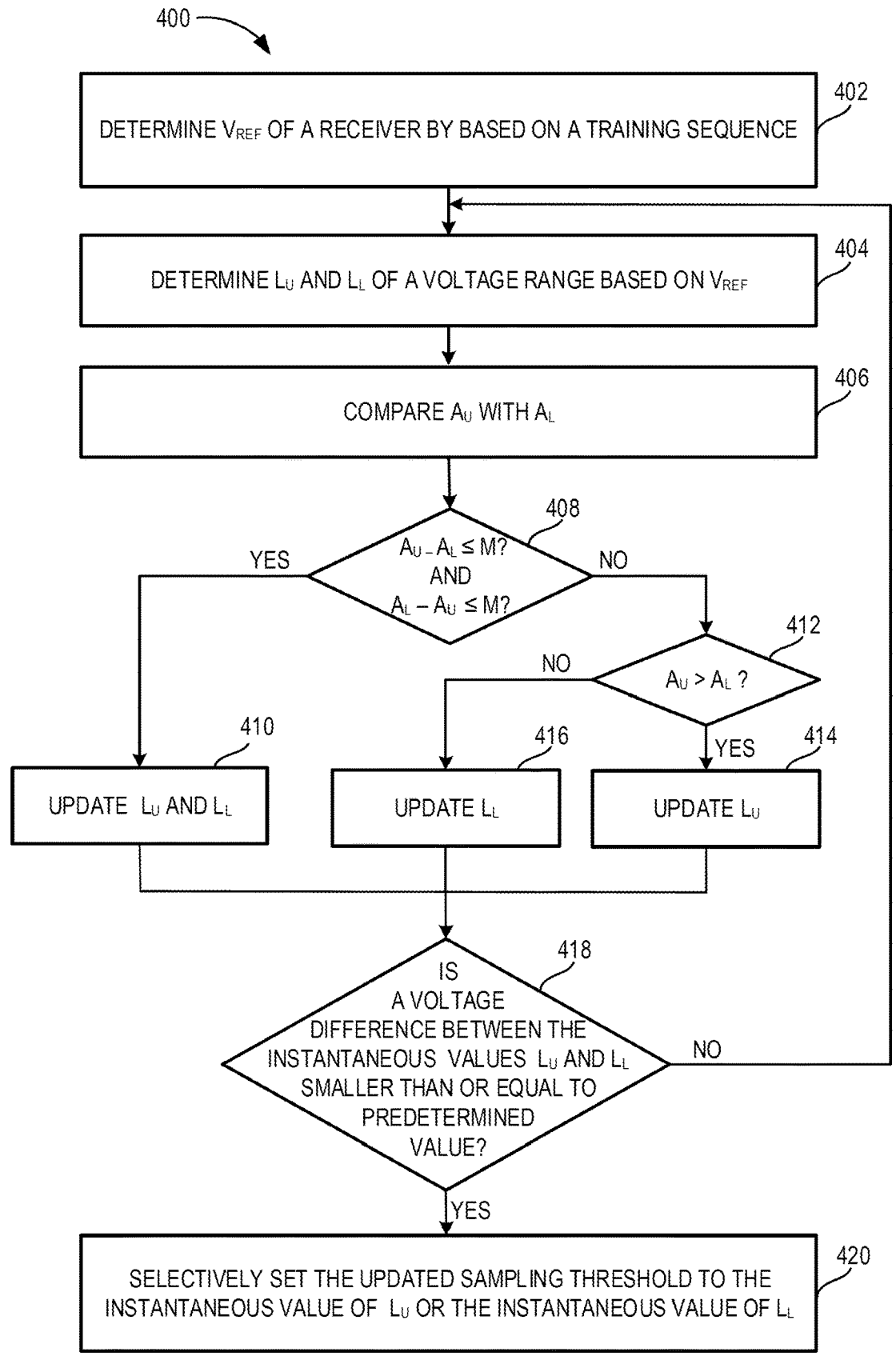
FIG. 4 is a flowchart of a method for determining a sampling threshold of a SERDES receiver, in accordance with another example.

FIGS. 3 and 4 are flow diagrams respectively depicting example methods 300 and 400 for determining a sampling threshold (i.e., an updated sampling threshold) of a receiver (e.g., the SERDES receiver 100 of FIG. 1). The methods 300 and 400 may, for example, be executed by a controller (e.g., the controller 106 of FIG. 1). For illustration purposes, the execution of example methods 300 and 400 is described in conjunction with the controller 106 of FIG. 1. Although the methods 300 and 400 are described with reference to the controller 106 of FIG. 1, other applications or devices suitable for the execution of the example methods 300 and 400 may be utilized.

In FIG. 3, at block 302, the method 300 may include determining a reference sampling threshold ($V_{ref}$) of the receiver 100 by analyzing a data signal of a training sequence received by the receiver 100. In some examples, the controller 106 may locate a center of an eye (e.g., defined between level 0 and level 1) of the eye diagram and establish $V_{ref}$ at a voltage level corresponding to the center of the eye as described earlier with reference to FIGS. 1 and 2A.

As block 304, the method 300 may include determining an upper voltage level $L_U$ and a lower voltage level $L_L$ of a voltage range containing the updated sampling threshold of the receiver 100 based on $V_{ref}$. In some examples, the controller 106 may determine $L_U$ and a $L_L$ based on the relationships presented in the equations (1) and (2). Further, at block 306, the method 300 may include comparing an upper voltage accumulated hit rate $A_U$ with a lower voltage accumulated hit rate $A_L$. In some examples, the controller 106 may determine $A_U$ and $A_L$ as described previously and compare them with each other according to the comparison margin (M) (equation (7)) and the comparison conditions of equations (8a)-(8d).

At block 308, the method 300 may include updating at least one of $L_U$ or $L_L$ based on the comparison of $A_U$ and $A_L$. In some examples, the controller 106 may update at least one of $L_U$ or $L_L$ using the update conditions of Table 1, as described previously. In some instances, when the absolute difference between $A_U$ and $A_L$ is greater than the comparison margin (M) (i.e., $A_L$ and $A_U$ satisfy the comparison condition of equation (8a) or (8b)), the controller 106 may update one of $L_U$ or $L_L$. When the absolute difference between $A_U$ and $A_L$ is smaller than or equal to the comparison margin (M) (i.e., $A_L$ and $A_U$ satisfy the comparison conditions of equations (8c) and (8d)), the controller 106 may update both $L_U$ or $L_L$.

At block 310, the method 300 may include determining whether a voltage difference (i.e., $Vd_1$) between the instantaneous values of $L_U$ (previous or updated value) and $L_L$ (previous or updated value) is smaller than or equal to the predetermined value (i.e., the voltage interval ($\Delta V$)). In some examples, the controller 106 may perform a check, at block 310, to determine whether $Vd_1$ is smaller than or equal to the predetermined value. At block 310, if it is determined that $Vd_1$ is smaller than or equal to the predetermined value, the controller 106, at block 312, may selectively set the updated sampling threshold of the receiver 100 at one of the instantaneous values of $L_U$ or $L_L$ depending on $A_U$ and $A_L$) corresponding to the instantaneous values of $L_U$ and $L_L$. The controller 106 may set the updated sampling threshold of the receiver 100 at the instantaneous value of $L_U$ or the instantaneous value of $L_L$ for which the accumulated hit rate (e.g., $A_U$ or $A_L$) is a lower value.

Referring to block 310 again, at block 310, if it is determined that the $Vd_1$ is greater than the predetermined value, the method 300 may return to block 304. In some examples, the method 300 may repeat block 304 to determine an upper voltage level (i.e., a new upper voltage level) and a lower voltage level (i.e., a new lower voltage level) of the voltage range containing the updated sampling threshold for the next iteration. In some examples, the controller 106 may set the new upper voltage level at the instantaneous value of $L_U$ and the new lower voltage level at the instantaneous value of $L_L$. The method 300 may then repeat block 306 to compare $A_U$ corresponding to the set $L_U$ (i.e., new upper voltage level) with $A_L$ corresponding to the set $L_L$ (i.e., new lower voltage level) and block 308 to update at least one of the set $L_U$ or the set $L_L$. The method 300 may then repeat block 310 to determine whether a voltage difference (i.e., $Vd_2$) between the instantaneous values of the set $L_U$ and the set $L_L$ is smaller than or equal to the predetermined value (e.g., the voltage interval $\Delta V$). In some examples, when $Vd_2$ is smaller than or equal to the predetermined value, the method 300 may include selectively setting the updated sampling threshold of the receiver 100 at one of the instantaneous values of the set $L_U$ or the set $L_L$. In some examples, when $Vd_2$ is greater than the predetermined value, the method 300 may again return to block 304. In some examples, the method 300 may include iteratively performing the method blocks 304, 306, 308, and 310 until the method 300 determines that a voltage difference between the instantaneous values of $L_U$ and $L_L$ is smaller than or equal to the predetermined value.

FIG. 4 includes certain method blocks that are similar to one or more method blocks described in FIG. 3, details of which are not repeated herein for the sake of brevity. By way of example, blocks 402, 404, 406, 418, and 420 of FIG. 4 are respectively similar to blocks 302, 304, 306, 310, and 312 of FIG. 3.

At block 402, the controller 106 may determine a reference sampling threshold ($V_{ref}$) of the receiver 100 by analyzing a data signal of a training sequence received by the receiver 100. At block 404, the controller 106 may determine an $L_U$ and a $L_L$ of a voltage range containing the updated sampling threshold of the receiver 100 based on $V_{ref}$. At block 406, the controller 106 may compare an upper voltage accumulated hit rate $A_U$ with a lower voltage accumulated hit rate $A_L$. In some examples, the controller 106 may compute $A_U$ and $A_L$, as described previously, and compare $A_U$ with $A_L$ according to a comparison margin (M) (equation (7)) and the comparison conditions represented in equations (8a)-(8d).

At block 408, the controller 106 may perform a check to determine whether an absolute difference between $A_U$ and $A_L$ is smaller than or equal to the comparison margin (M). At block 408, if it is determined that the absolute difference between $A_U$ and $A_L$ is smaller than or equal to the comparison margin (M) (i.e., $A_U$ and $A_L$ satisfy the comparison conditions of equations (8c) and (8d)), the controller 106, at block 410, may update both $L_U$ and $L_L$. The method 400 then proceeds to block 418.

At block 408, if it is determined that the absolute difference between $A_U$ and $A_L$ is greater than the comparison margin (M) (i.e., $A_U$ and $A_L$ satisfy the comparison condition of equation (8a) or (8b)), the method 400 may proceed to block 412. At block 412, the controller 106 may again perform a check to determine whether $A_U$ is more than $A_L$. At block 412, if it is determined that $A_U$ is more than $A_L$ (i.e., $A_U > A_L$, and $A_U$ and $A_L$ satisfy the comparison condition of equation (8b)), the controller 106, at block 414, may update $L_U$. In such instances, the controller 106 may retain $L_L$ at the previous value. The method 400 then proceeds to block 418.

Referring to block 412 again, if it is determined that $A_U$ is less than $A_L$ (i.e., $A_U < A_L$, and $A_U$ and $A_L$ satisfy the comparison conditions of equation (8a)), the controller 106, at block 416, may update $L_L$. In such instances, the controller 106 may retain $L_U$ at the previous value. The method 400 then proceeds to block 418.

At block 418, the controller 106 may again perform a check to determine whether $Vd_1$ is smaller than or equal to the predetermined value (e.g., voltage interval $\Delta V$). At block 418, if it is determined that $Vd_1$ is smaller than or equal to the predetermined value, the controller 106 may selectively set the updated sampling threshold at one of the instantaneous values of $L_U$ or $L_L$ for which an accumulated hit rate (e.g., any of the $A_U$ or $A_L$) is observed to be lower. For example, when $A_L$ corresponding to the instantaneous value of $L_L$ is lower than $A_U$ corresponding to the instantaneous value of $L_U$, the controller 106 may set the updated sampling threshold at the instantaneous value of $L_L$.

Referring to block 418 again, if it is determined that $Vd_1$ is greater than the predetermined value, the method 400 may return to block 404 and iteratively perform the method blocks 404, 406, 408, 410, 412, 414, 416, and 418 until the method 400 determines that a voltage difference between the instantaneous values of $L_U$ and $L_L$ is smaller than or equal to the predetermined value (e.g., voltage interval $\Delta V$).

In the examples described herein, functionalities described as being performed by "instructions" may be understood as functionalities that may be performed by those instructions when executed by a processing resource. In other examples, functionalities described in relation to instructions may be implemented by one or more modules, which may be any combination of hardware and programming to implement the functionalities of the modules.

As used herein, "machine-readable storage medium" may be any electronic, magnetic, optical, or other physical storage apparatus to contain or store information such as executable instructions, data, and the like. For example, the machine-readable storage medium may be a random-access memory (RAM) or another type of dynamic storage device that may store information and machine-readable instructions that may be executed by the processor. In an example, the machine-readable storage medium may be a non-transitory machine-readable medium.

The terminology used herein is for the purpose of describing example embodiments only and is not intended to be limiting. As used herein, the singular forms "a," "an," and "the" are intended to include the plural forms as well, unless the context indicates otherwise. The term "plurality," as used herein, is defined as two or more than two. The term "coupled," as used herein, is defined as connected, whether directly without any intervening elements or indirectly with at least one intervening element, unless otherwise indicated. The term "and/or" as used herein refers to and encompasses any or all possible combinations of one or more of the associated listed items. The presence of broadening words and phrases such as "one or more," "at least," "but not limited to" or other like phrases in some instances shall not be read to mean that the narrower case is intended or required in instances where such broadening phrases may be absent.

The foregoing description of various examples has been presented for purposes of illustration and description. The foregoing description is not intended to be exhaustive or limited to the examples disclosed, and modifications and variations are possible in light of the above teachings or may be acquired from the practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

What is claimed is:

1. A method, comprising:
   determining, by a controller, a reference sampling threshold of a receiver according to a training sequence received by the receiver;
   determining, by the controller, an upper voltage level and a lower voltage level of a voltage range based on the reference sampling threshold;
   comparing, by the controller, an upper voltage accumulated hit rate with a lower voltage accumulated hit rate;
   based on the comparison, performing, by the controller, at least one of decrementing the upper voltage level or incrementing the lower voltage level; and
   in response to determining that a first voltage difference between an instantaneous value of the upper voltage level and an instantaneous value of the lower voltage level is smaller than or equal to a predetermined value, selectively setting, by the controller, an updated sampling threshold of the receiver to the instantaneous value of the upper voltage level or the instantaneous value of the lower voltage level based on the upper voltage accumulated hit rate and the lower voltage accumulated hit rate at the instantaneous values of the upper voltage level and the lower voltage level, respectively.

2. The method of claim 1, wherein the reference sampling threshold corresponds to a voltage for which a predetermined hit rate is observed.

3. The method of claim 1, wherein the reference sampling threshold corresponds to a voltage in a middle of a range of voltages defining an eye scan information generated based on the training sequence.

4. The method of claim 1, further comprising computing, by the controller, a comparison margin based on the upper voltage accumulated hit rate and the lower voltage accumulated hit rate.

5. The method of claim 1, wherein the comparing comprises determining whether an absolute difference between the upper voltage accumulated hit rate and the lower voltage accumulated hit rate is smaller than or equal to a comparison margin.

6. The method of claim 5, wherein the updating comprises updating one of the upper voltage level or the lower voltage level in response to determining that the absolute difference between the upper voltage accumulated hit rate and the lower voltage accumulated hit rate is greater than the comparison margin.

7. The method of claim 5, wherein the updating comprises updating both the upper voltage level and the lower voltage level in response to determining that the absolute difference between the upper voltage accumulated hit rate and the lower voltage accumulated hit rate is smaller than or equal to the comparison margin.

8. The method of claim 1, wherein selectively setting comprises setting the updated sampling threshold of the receiver at the instantaneous value of the upper voltage level or the instantaneous value of the lower voltage level for which respective one of the upper voltage accumulated hit rate and the lower voltage accumulated hit rate is a lower value.

9. The method of claim 1, further comprising:
   in response to determining that the first voltage difference is greater than the predetermined value, iteratively performing, by the controller,
   comparing the upper voltage accumulated hit rate with the lower voltage accumulated hit rate;
   updating at least one of the upper voltage level or the lower voltage level based on the comparison;
   after updating at least one of the upper voltage level or the lower voltage level, determining whether a second voltage difference between the instantaneous values of the upper voltage level and the lower voltage level is smaller than or equal to the predetermined value; and
   in response to determining that the second voltage difference is smaller than or equal to the predetermined value, selectively setting the updated sampling threshold of the receiver at the instantaneous value of the upper voltage level or the instantaneous value of the lower voltage level based on the upper voltage accumulated hit rate and the lower voltage accumulated hit rate corresponding to the instantaneous values of the upper voltage level and the lower voltage level.

10. A controller of a receiver, comprising:
    a processor; and
    a non-transitory machine-readable storage medium comprising instructions executable by the processor to:
      determine a reference sampling threshold of the receiver based on a training sequence received by the receiver;
      determine an upper voltage level and a lower voltage level of a voltage range based on the reference sampling threshold;
      compare an upper voltage accumulated hit rate with a lower voltage accumulated hit rate;
      update at least one of the upper voltage level or the lower voltage level based on the comparison; and
      in response to determining that a first voltage difference between an instantaneous value of the upper voltage level and an instantaneous value of the lower voltage level is smaller than or equal to a predetermined value, selectively set an updated sampling threshold of the receiver to the instantaneous value of the upper voltage level or the instantaneous value of the lower voltage level based on the upper voltage accumulated hit rate and the lower voltage accumulated hit rate at the instantaneous values of the upper voltage level and the lower voltage level, respectively.

11. The controller of claim 10, wherein the reference sampling threshold corresponds to a voltage for which a predetermined hit rate is observed.

12. The controller of claim 10, wherein the reference sampling threshold corresponds to a voltage in a middle of a range of voltages defining an eye scan information generated based on the training sequence.

13. The controller of claim 10, wherein the instructions comprise instructions executable by the processor to compute a comparison margin based on the upper voltage accumulated hit rate and the lower voltage accumulated hit rate.

14. The controller of claim 10, wherein the instructions to compare comprise instructions executable by the processor to determine whether an absolute difference between the upper voltage accumulated hit rate and the lower voltage accumulated hit rate is smaller than or equal to a comparison margin.

15. The controller of claim 14, wherein the instructions to update comprise instructions executable by the processor to update one of the upper voltage level or the lower voltage level in response to determining that the absolute difference between the upper voltage accumulated hit rate and the lower voltage accumulated hit rate is greater than the comparison margin.

16. The controller of claim 14, wherein the instructions to update comprise instructions executable by the processor to update both the upper voltage level and the lower voltage level in response to determining that the absolute difference between the upper voltage accumulated hit rate and the lower voltage accumulated hit rate is smaller than or equal to the comparison margin.

17. The controller of claim 10, wherein the instructions to update the upper voltage level comprise instructions executable by the processor to decrement the upper voltage level by the predetermined value and the instructions to update the lower voltage level comprise instructions executable by the processor to increment the lower voltage level by the predetermined value.

18. The controller of claim 10, wherein the instructions to selectively set comprise instructions executable by the processor to set the updated sampling threshold of the receiver at the instantaneous value of the upper voltage level or the instantaneous value of the lower voltage level for which respective one of the upper voltage accumulated hit rate and the lower voltage accumulated hit rate is a lower value.

19. The controller of claim 10, wherein the instructions further comprise instructions executable by the processor to:
in response to determining that the first voltage difference is greater than the predetermined value, perform a next iteration to:
compare the upper voltage accumulated hit rate corresponding to the instantaneous value of the upper voltage level with the lower voltage accumulated hit rate corresponding to the instantaneous value of the lower voltage level;
update at least one of the upper voltage level or the lower voltage level based on the comparison;
after updating at least one of the upper voltage level or the lower voltage level, determine whether a second voltage difference between the instantaneous values of the upper voltage level and the lower voltage level is smaller than or equal to the predetermined value; and
in response to determining that the second voltage difference is smaller than or equal to the predetermined value, selectively set the updated sampling threshold of the receiver at the instantaneous value of the upper voltage level or the instantaneous value of the lower voltage level based on the upper voltage accumulated hit rate and the lower voltage accumulated hit rate at the instantaneous values of the upper voltage level and the lower voltage level, respectively.

20. A receiver comprising:
a front-end circuit to receive a training sequence;
a sampling circuit to determine symbols from the training sequence; and
a controller coupled to the sampling circuit to receive the symbol, wherein the controller is configured to:
determine a reference sampling threshold for the sampling circuit based on the symbols;
determine an upper voltage level and a lower voltage level of a voltage range based on the reference sampling threshold;
compare an upper voltage accumulated hit rate with a lower voltage accumulated hit rate;
update at least one of the upper voltage level or the lower voltage level based on the comparison; and
in response to determining that a first voltage difference between an instantaneous value of the upper voltage level and an instantaneous value of the lower voltage level is smaller than or equal to a predetermined value, selectively set an updated sampling threshold of the receiver to the instantaneous value of the upper voltage level or the instantaneous value of the lower voltage level based on the upper voltage accumulated hit rate and the lower voltage accumulated hit rate at the instantaneous values of the upper voltage level and the lower voltage level, respectively.

* * * * *